Jan. 5, 1971 G. R. HANES ET AL 3,552,826
VARIABLE INTERFERENCE REFLECTOR

Filed Feb. 19, 1968                  3 Sheets-Sheet 1

INVENTORS:
GARNET R. HANES ET AL
By: Malle & Malle
ATTORNEYS

United States Patent Office 3,552,826
Patented Jan. 5, 1971

3,552,826
VARIABLE INTERFERENCE REFLECTOR
Garnet R. Hanes, Jerzy A. Dobrowolski, and Cornelis J. Van der Hoeven, Ottawa, Ontario, Canada, assignors to Canadian Patents and Development Limited, Ottaway, Ontario, Canada, a corporation of Canada
Filed Feb. 19, 1968, Ser. No. 706,595
Claims priority, application Canada, Jan. 31, 1968, 11,204
Int. Cl. G02b 5/28
U.S. Cl. 350—166     3 Claims

ABSTRACT OF THE DISCLOSURE

A reflector device capable of providing a desired value of reflectance and having a multi-layer reflecting surface which gradually decreases in thickness, for example exponentially, from one end to the other end so that the reflectance value at any point is dependent on the position of the point and varies logarithmically across the surface. The device is provided with two controls, one being a reflectance adjustment control and the other a wavelength adjustment control.

---

This invention relates to reflector devices and methods of constructing reflector devices.

Reflector devices capable of providing a required value of reflectance are sometimes used in research on the suitability of various materials for the construction of lasers. In such a case, it is often desirable to be able to vary the reflectance of the mirrors making up the optical device and, for this reason, a plurality of mirrors are often provided, each having a different reflectance.

Interference microscopes are often used to measure the thickness of thin films in the optical, magnetic and electronic thin film technological arts and often the reflectances of the reference flats used in these instruments have to be carefully matched to the reflectivity of the sample in order to ensure the highest possible precision of the respective measurements. Instrument manufacturers presently supply sets of reference mirrors with their interference microscopes in order that the different reflectivity values can be obtained.

It will be appreciated that when mirrors have to be interchanged in order to obtain different value of reflectance, then this is time-consuming since it requires a realignment of the respective optical system and furthermore, the cost is considerable if one is to facilitate the selection of different values of reflectance at any given wavelength in a relatively wide range of reflectivity and wavelength. A large number of mirrors must be provided, each having a different reflectance.

The provision of a plurality of mirrors, as mentioned above, is inconvenient and relatively expensive and it is an object from one aspect of the present invention to provide a reflector device capable of providing a plurality of reflectance values at different wavelengths without the use of the interchangeable mirrors referred to above.

Accordingly, there is provided a reflector device including a reflecting surface whose value of reflectance at any point thereon is dependent on the position of said point on said surface, the reflectance value of the device varying in a predetermined manner across said surface.

From another aspect of the present invention, there is provided a method of constructing a reflector device capable of providing a plurality of reflectance values without the use of the interchangeable mirrors referred to above.

According to this aspect, there is provided a method of constructing a reflector device including the steps of forming a multilayer reflecting surface on a substrate member by depositing a first thin film layer of optical material on said substrate member having a first thickness at one end of a reflecting surface and a second smaller thickness at the opposite end of the reflecting surface and a thickness between which gradually decreases exponentially from said one end to said opposite end; and depositing one or more thin film layers in optical material on top of said first layer in succession, each having a first thickness at one end of the reflecting surface and a second smaller thickness at the opposite end of the reflecting surface and a second smaller thickness at the opposite end of the reflecting surface and a thickness between which gradually decreases exponentially from said one end to said opposite end.

The invention will now be described, by way of example, with reference to the accompanying drawings in which.

Figure 1:
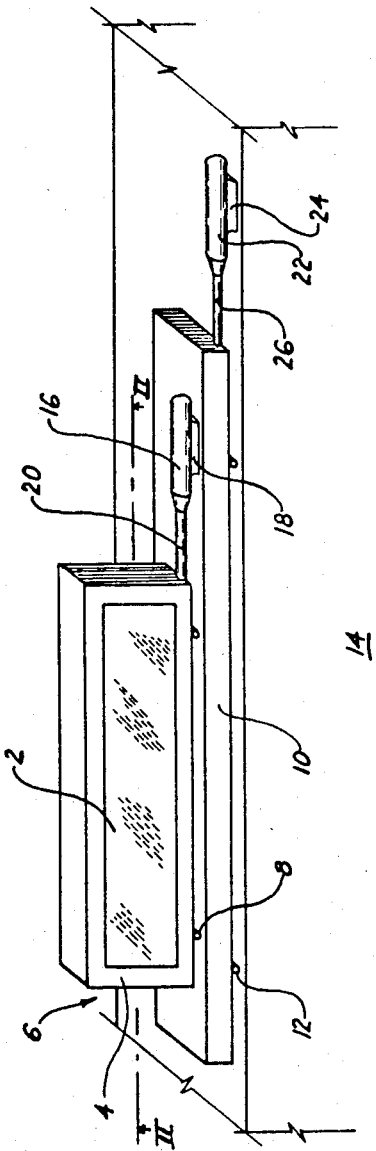
FIG. 1 is a perspective view in diagrammatic form of a reflector device according to the present invention.

Referring to FIG. 1, the reflector device comprises a reflecting surface 2 formed on a substrate member 4 forming part of a first carriage 6 mounted on roller means 8. It will be appreciated that, instead of roller means 8, a slider means may be provided whereby a part of the first carriage 6 slides in corresponding grooves to facilitate linear movement of the first carriage.

By the roller means 8, the first carriage 6 is mounted on a second carriage 10 which is itself mounted by second roller means 12 on a supporting member 14.

As stated above, the first carriage is capable of relative movement with respect to the second carriage by means of the roller means 8. Between the first and second carriage, there is provided a mechanism in the form of a first calibrated adjustment means 16 having a part 18 integrally connected with the second carriage 10 and a plunger portion 20 abutting against the first carriage 6 so that on adjustment of the adjustment means 16, the plunger 20 produces relative movement between the first carriage 6 and the second carriage 10. A similar second calibrated adjustment means 22 is provided as a wavelength adjustment means between the second carriage 10 and the supporting member 14. A part 24 is integral with the supporting member 14 whilst a plunger portion 26 is in contacting relationship with the second carriage 10 so as to produce relative movement between the second carriage 10 and the supporting member 14. Thus, two independent displacements of the reflecting surface may be achieved and the total displacement of the reflecting surface will be the sum of the two independent displacements.

Figure 2:
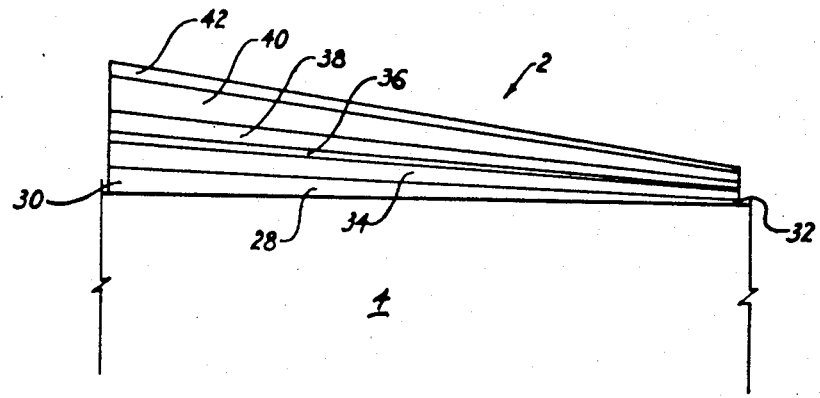
FIG. 2 is a diagrammatic representation in side view, on line II—II of FIG. 1, of part of the reflector device as shown in FIG. 1 to illustrate the construction of the multi-layer reflecting surface thereof.

The reflecting surface 2 is a multi-layer reflecting surface and its construction is illustrated in FIG. 2. A first thin film layer 28 of optical material is deposited on the substrate member 4 by any well known technique. The thin film layer 28 is formed with a first thickness at one end 30 and a second smaller thickness at the opposite end 32 and the thickness of the layer 28 gradually decreases exponentially from said one end 30 to the opposite end 32, as will be clear from FIG. 2. A further layer 34 of optical material is deposited on top of the first layer and having a similar thickness and cross-sectional shape whilst further layers 36, 38, 40 and 42 are deposited on top of the previous layer so as to provide a multi-layer reflecting surface having a cross-sectional wedge shape as illustrated in FIG. 2.

The construction of the multi-layer reflecting surface according to the described embodiment of the present invention must satisfy certain theoretical considerations as will be clear from the discussion below.

The reflectance R of the multi-layer reflecting surface is a function of $\lambda/t$ only, where $t$ is the overall thickness of the multi-layer surface and $\lambda$ represents the wavelength of the incident light, $[R=R(\lambda/t)]$. The thickness $t$ of the reflecting layer 2 at any point along the layer from end 30 to end 32 is a function of the distance $\theta$ (linear or angular) along the reflecting surface. This may be expressed as $t=t(\theta)$. In order that the reflector device may be constructed with an independent reflectance adjustment means 16 and an independent wavelength adjustment means 22, the required condition is that $\partial R/\partial \theta$ must be independent of the distance $\theta$ and the wavelength $\lambda$. Therefore, the equations which must be satisfied are:

$$\frac{\partial^2 R}{\partial \lambda \partial \theta}=0 \qquad (1)$$

and $$\frac{\partial^2 R}{\partial \theta^2}=0 \qquad (2)$$

The differential Equations 1 and 2 have a unique solution which is given by $$t=e^{A\theta+B} \qquad (3)$$

$$R=C \log \left(\frac{\lambda}{t}\right)+D \qquad (4)$$

The values of the integration constants A, B, C and D determine the range of the values of the reflectance and wavelength over which the device will operate.

If $t$ is eliminated between Equations 3 and 4, the result can be written in the form $$\theta=\theta_0+\theta_R+\theta_\lambda \qquad (5)$$

where $$\theta_0=(D-CB)/AC$$

$$\theta_R=R/AC$$

$$\theta_\lambda=\log (\lambda)/A \qquad (6)$$

Figure 3:
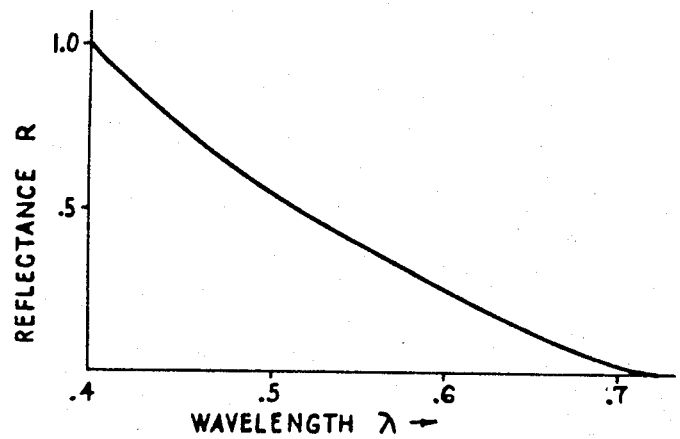
FIG. 3 is one possible graphical plot of the reflectance value R against wavelength λ for one point on the multi-layer reflecting surface illustrated in FIG. 2.

Equation 4 has been utilized to prepare a graphical representation in FIG. 3 of the reflectance R against the wavelength $\lambda$. FIG. 3 corresponds to a certain set of constants A, B, C and D. From a consideration of FIG. 3 and Equation 4, it will be seen that the reflecting surface must be so constructed that at any given point, the reflectance at that point will vary logarithmically with the incident wavelength. The reflecting surface must be so constructed that the spatial variation of the thickness (i.e. the change in thickness between end 30 and end 32) is exponential as defined by Equation 3 above. In this way, it can be ensured that the reflectance adjustment control 16 is linear and the wavelength adjustment control 22 is logarithmic (see Equation 6 above) and that the two adjustments are independent.

The theoretically desired reflectance versus wavelength characteristics can, in practice, be achieved in a multi-layer designed by, for example, an automatic thin film synthesis program such as that described by J. A. Dobrowolski in an article "Completely Automatic Synthesis of Optical Thin Film Systems" in "Applied Optics," volume 4, page 937, August 1965.

For each wavelength and reflectance range combination, the theoretical curve (plotting reflectance against wavelength) is unique. Once one has produced the theoretical curve, several constructions of a multi-layer are possible to satisfy that curve more or less exactly and the characteristics (construction parameter such as thickness, refractive index, and absorption coefficient) of each layer forming part of the multi-layer can be calculated. The characteristics of the finally-selected multi-layer will depend on the degree of accuracy required since, in general, the greater the number of layers the greater the accuracy which will be obtained.

A suitable multi-layer reflecting surface can thus be constructed by first producing a theoretically desirable curve for a multilayer having the desired reflectance and wavelength range. From the curve, one can then calculate the required filter, i.e. multi-layer, characteristics. The required multi-layer reflector device can then be constructed.

From the above theoretical discussion, it will be seen that the embodiment of the invention which is illustrated in FIG. 1 should advantageously be constructed in accordance with the Equation 3 and 4 so that independent adjustments for selected wavelengths and reflectance values may be chosen and the appropriate control means 16 and 22 be calibrated accordingly. As shown, the first carriage 6 is movable on the second carriage 10 by means of the wavelength adjustment control means 16 which is attached to the second carriage 10. The second carriage, in turn, is adjustable in position in a parallel direction by means of the wavelength adjustment control means 22. It will be appreciated that in some arrangements, it may be convenient to interchange the controls 16 and 22 so that the control 16 becomes the logarithmic wavelength adjustment control and the control 22 becomes the linear reflectance adjustment control. This can, of course, be achieved without difficulty.

A man skilled in the art would, of course, have no difficulty in selecting the values for the four integration constants A, B, C, and D and would be able to construct a reflecting surface for use in a reflector device according to the present invention, particularly having regard to the above-mentioned article by J. A. Dobrowolski from "Applied Optics." The steps to be followed would be quite clear and would be as follows:

Steps required to produce a reflective layer system for the reflector device having a reflectance adjustable over the range $R_0$ to $R_1$, the wavelength at which this reflectance is desired adjustable over the range $\lambda_0$ to $\lambda_1$, and the distance on the reflecting surface to vary from 0 at one end to 1 at the other. (This choice does not restrict the generality because we may measure the distance in any units whatsoever to obtain the distance actualy wanted.)

(1) THE MASTER DESIGN

By use of a computer program such as described by Dobrowolski, Applied Optics 4, 937 (1965), or other design method, the refractive indexes and thicknesses of a thin film layer system may be calculated when the required reflectance versus wavelength curve is given. Here we require that the reflectance should vary logarithmically with wavelength between $R_0$ at an arbitrary wavelength $\lambda_x$, and $R_1$ at another arbitrary wavelength $\lambda_y$. Let us suppose that T is the total thickness of the film system resulting from this design process, which we call the master design. Obviously the variation of reflectance R with wavelength $\lambda$ is given by $$R=R_0+(R_1-R_0) \log \lambda_x-\log \lambda)/ (\log \lambda_x-\log \lambda_y)$$

and this may be easily written in the form of Equation 4 by choosing $$C=(R_0-R_1)/\log (\lambda_x/\lambda_y)$$

and $$D=(R_1 \log (\lambda_x/T)-R_0 \log (\lambda_y/T))/\log (\lambda_x/\lambda_y)$$

(2) CONSTRUCTION

The layer system is evaporated through a suitable mask (or other means) to produce a film system having its thickness vary exponentially with distance on the substrate. Such techniques are well known in the thin film art. The individual layers have thicknesses in the same proportion as those in the master design. The thickness $t(0)$ at one end ($\theta=0$) is chosen so that $t(0)/\lambda_0=T/\lambda_x$, so that the film will have reflectance $R_0$ at wavelength $\lambda_0$ at this point. The thickness $t(1)$ at the other end ($\theta=0$) is chosen so that $t(1)/\lambda_1 = T/\lambda_y$, so that the reflectance is $R_1$ at wavelength $\lambda_1$. The variation of thickness with distance along the film will thus be described by $$t(\theta) = \exp(\log t(0) + \theta(\log(t_1) - \log(t_0)))$$

which can readily be seen to have the form of Equation 3 if we choose $$A = \log(\lambda_1\lambda_x/\lambda_0\lambda_y)$$
$$B = \log(T\lambda_0/\lambda_x).$$

The above information would be apparent to a man skilled in the art who would thus have no difficulty in constructing a device according to the present invention, after reading the specification.

To achieve the linear displacement, any suitable means may be utilized. For example, coaxial screws, levers or bands may be utilized.

It will be appreciated that instead of the linear motion referred to above, a device according to the invention may be constructed utilizing angular motion. For example, one may make a reflector device having a curved reflecting surface and providing means to produce tangential movement. The variation of thickness of the layers will, of course, still be exponential.

Figure 4:
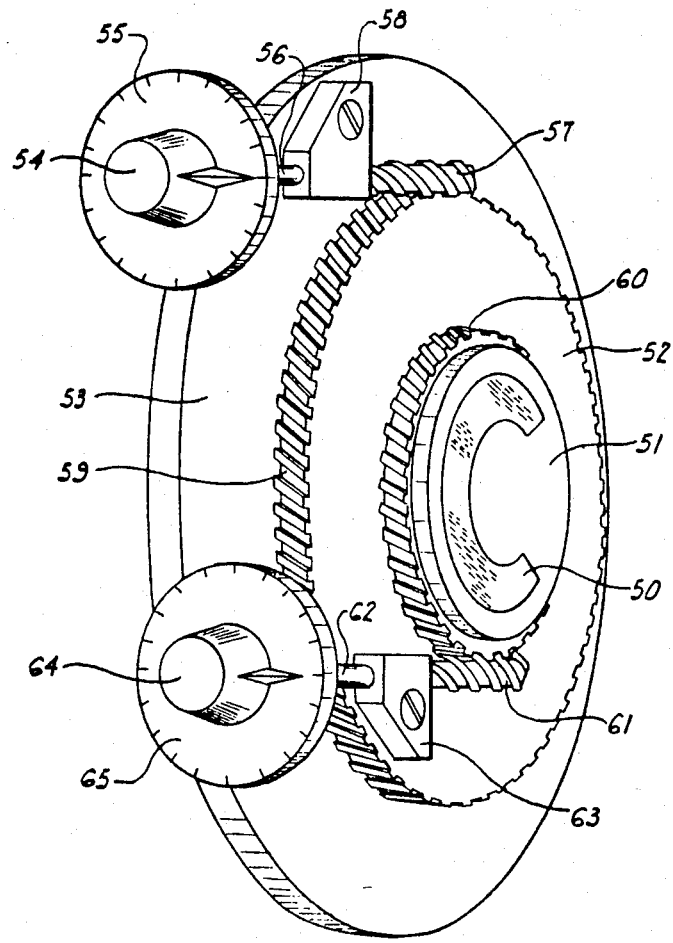
FIG. 4 is a diagrammatic representation of a second embodiment of the present invention utilizing angular movement.

To obtain angular displacement, bands or arrangements of differential gears may, for example, be used. In FIG. 4, there is shown a second embodiment of the present invention utilizing angular movement.

In FIG. 4, the reflecting surface 50 is C-shaped, as shown, and is formed on a first carriage which is a disc-shaped member 51 mounted on a second disc-shaped member 52 constituting a second carriage. The second carriage is itself mounted on a supporting member 53 and is capable of angular movement with respect thereto in accordance with the desired wavelength by way of a wavelength adjustment means. As shown in FIG. 4, the wavelength adjustment means includes a control knob and pointer arrangement 54 rotatable with respect to a graduated circular scale 55. Rotation of the control knob results in rotation of an integral shaft 56 having a shaft worm gear 57 at its free end and rotatably held in a mounting 58 attached to the supporting member 53. The worm gear 57 engages with teeth 59 on the periphery of the second disc-shaped member 52 whereby a worm-gear wheel arrangement is provided to facilitate angular motion of the reflecting surface 50 under control of the wavelength adjustment means.

The first disc-shaped member 51 also constitutes a gear wheel having peripheral teeth 60 cooperating with a shaft worm gear 61 on a shaft 62 rotatably held in a mounting 63 attached to the second disc-shaped member 52. The shaft 62 is rotatable by means of a control knob and pointer arrangement 64 rotatable with respect to a graduated circular scale 65 so as to form a reflectance adjustment means whereby angular movement of the reflecting surface 51 with respect to the supporting member 53 is facilitated in accordance with the desired value of reflectance. Thus a reflectance adjustment means is provided in addition to the above-mentioned wavelength adjustment means.

Angular movement of the reflecting surface 51, may, of course, be achieved by any suitable means, for example, bands or any form of differential gears.

In the embodiments described above, a reflector device is described in which the reflectance varies in a prescribed manner with wavelengths at each point on the reflecting surface. The optical multi-layer system described is, of course, a relatively simple method of achieving this where it is arranged so that the thickness of the individual layers making up the multi-layer surface vary in proportion across the reflecting surface (see FIG. 1). There are, of course, many other methods which may be used and embodiments constructed according to the present invention.

It will be appreciated that each of the described embodiments of the invention may well be utilized in commercial laser devices as an "adjustable mirror" to extend their life since the reflectance can be optimized to overcome the deterioration of the plasma tube with time.

We claim:
1. A reflector device including:
  (a) a reflecting surface whose value of reflectance at any point thereon is dependent on the position of said point on said surface,
  (b) said surface being a multi-layer surface formed by a plurality of thin-film layers of optical material, each of which has a first thickness at one end of the reflecting surface and a second smaller thickness at the opposite end of the reflecting surface and whose thickness gradually decreases exponentially from said one end to said opposite end,
  (c) the multi-layer surface being so designed that at any given point on the surface the reflectance value is logarithmically proportional to the wavelength of an incident energy beam,
  (d) a first calibrated adjustment means for moving said reflecting surface in accordance with a predetermined wavelength adjustment, $R/AC$, and
  (e) an independent second calibrated adjustment means for moving said reflecting surface in accordance with a predetermined reflectance adjustment, $\log(\lambda)/A$,
  (f) said reflecting surface being on a first carriage which is itself mounted on a second carriage and capable of relative movement with respect thereto under control of said second adjustment means; and
  (g) said second carriage being mounted on a supporting member and capable of relative movement with respect thereto under control of said first adjustment means,
  (h) wherein the multi-layer surface at any point is defined by the equations:

$$t = e^{\theta + B}$$

$$R = C \log(\lambda/t) + D$$

and wherein the reflectance $R$ is a function of $\lambda/t$ where $\lambda$ represents the wavelength of light, and the thickness $t$ is a function of the particular distance $\theta$ (linear or angular) of the respective point along the surface; A, B, C, and D being constants.

2. A reflector device according to claim 19 wherein said movement of the second carriage is linear and parallel to said movement of the first carriage.

3. A reflector device according to claim 19 wherein said movement of the second carriage is an angular movement.

References Cited
FOREIGN PATENTS
666,160     1952     Great Britain _____ 350—166

DAVID SCHONBERG, Primary Examiner
J. W. LEONARD, Assistant Examiner

U.S. Cl. X.R.
350—288

PO-1050
(5/69)

UNITED STATES PATENT OFFICE
CERTIFICATE OF CORRECTION

Patent No. 3,552,826                    Dated January 28, 1971

Inventor(s) GARNET R. HANES ET AL

It is certified that error appears in the above-identified patent and that said Letters Patent are hereby corrected as shown below:

Column 6, Claim 1, line 43(h) the formula $$t = e^{\theta + B}$$

should read $$t = e^{A\theta + B}$$

Column 6, Claim 2, line 54 "19" should read -- 1 --

Claim 3, line 57, "19" should read -- 1 --

Signed and sealed this 30th day of March 1971.

(SEAL)
Attest:

EDWARD M. FLETCHER, JR.           WILLIAM E. SCHUYLER, JR.
Attesting Officer                 Commissioner of Patents